April 26, 1932.  F. H. McLAIN  1,855,684
SHOCK ABSORBER
Filed Feb. 17, 1931  2 Sheets-Sheet 1
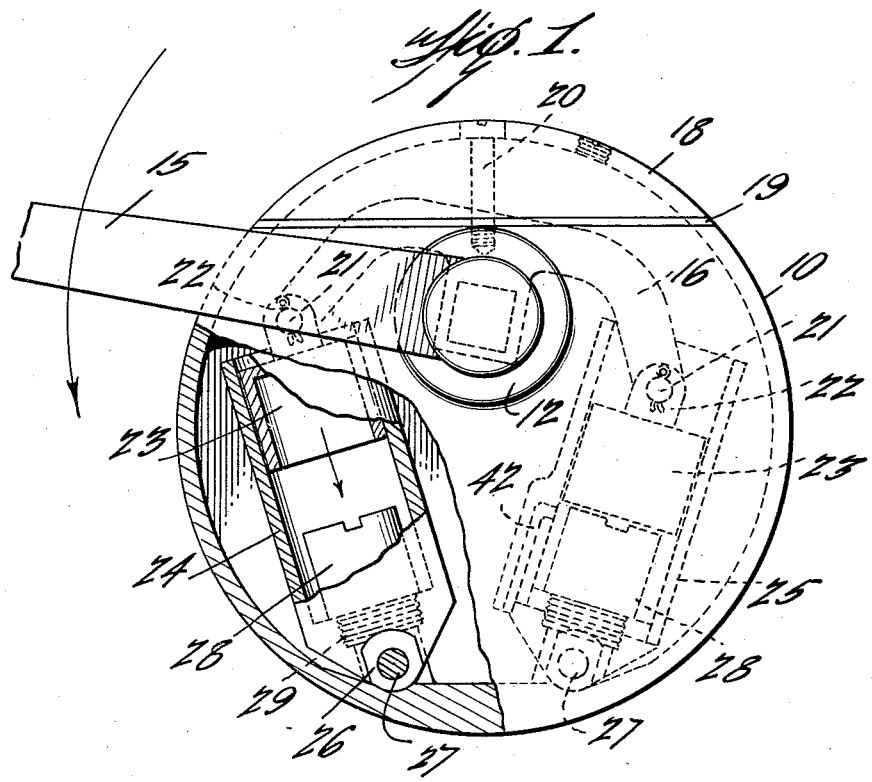
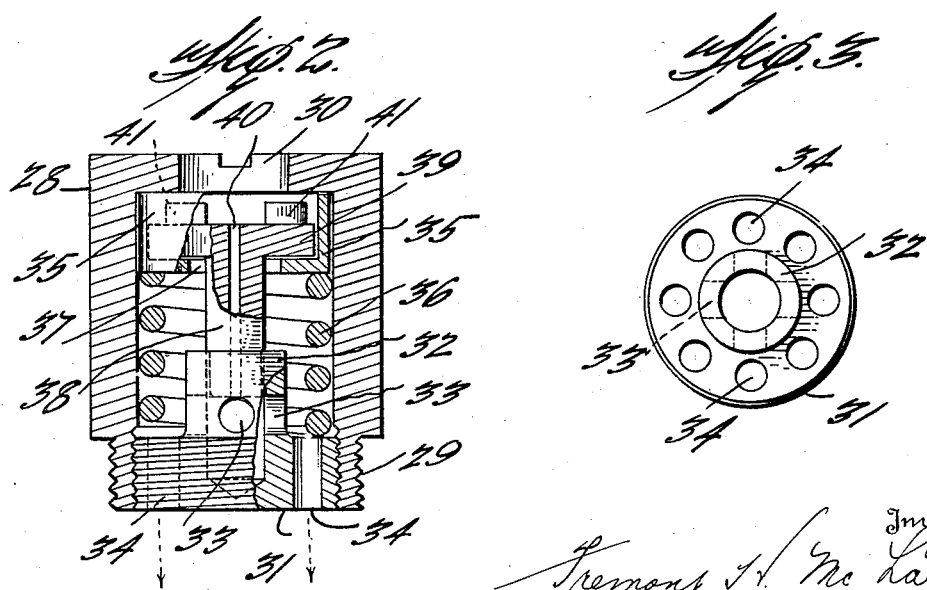
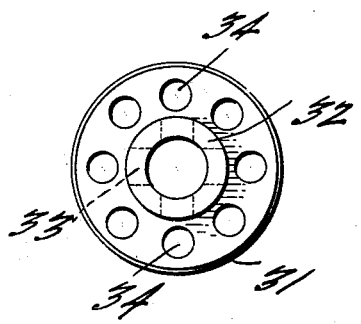

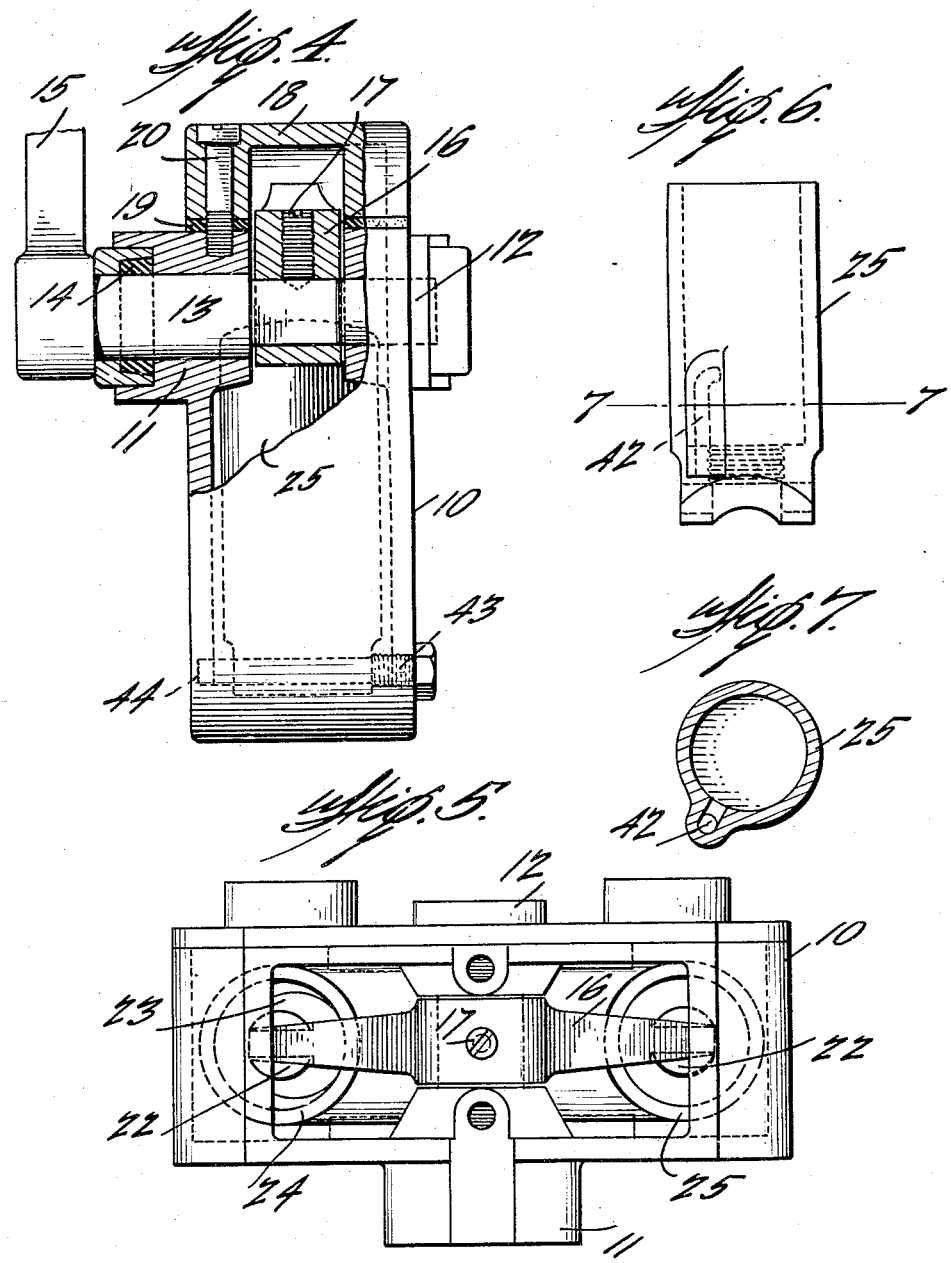

Patented Apr. 26, 1932

1,855,684

UNITED STATES PATENT OFFICE

FREMONT H. McLAIN, OF WELLSVILLE, OHIO

SHOCK ABSORBER

Application filed February 17, 1931. Serial No. 516,481.

This invention relates to shock absorbers, and particularly to one having two cylinders and a piston operating in each, each of said cylinders having a valve in its bottom for controlling the flow of fluid to produce a cushioning action, owing to the fact that the flow of fluid is somewhat retarded as force is exerted on it by the action of the piston.

It is furthermore an object of the invention to provide one of the cylinders with a by-pass auxiliary to the valve, it being the purpose of the inventor that the fluid shall be permitted to escape through the by-pass, under certain limited movement of the piston, the arrangement of parts being such that the port to the by-pass is sealed when the piston is moved a predetermined distance and thereafter fluid may escape from the cylinder only through the valve.

It is a further object of this invention to provide a novel valve through which fluid may circulate circuitously, by reason of which, more or less resistance to the free flowing of the fluid is presented, which results in checking the movement of the pistons causing them to dwell in their passage up and down the cylinder.

It is a still further object of the invention to provide a novel casing and assembly which is actuated by the movement of the springs of a vehicle with relation to the axles thereof, or other rigid parts of the structure.

It is furthermore an object of the invention to provide novel means by which the aforesaid movement is communicated to the pistons to cause them to move opposite to one another, according to the throw of an arm, as will presently appear.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a view in elevation partly in section of a shock absorber embodying the invention;

Figure 2 illustrates a sectional view of one of the valves;

Figure 3 illustrates a plan view of one part thereof;

Figure 4 illustrates a view in elevation partly in section of the device at right angles to that shown in Fig. 1;

Figure 5 illustrates a plan view of the interior of the shock absorber;

Figure 6 illustrates a detail view of one of the cylinders; and

Figure 7 illustrates a sectional view thereof on the line 7—7 of Fig. 6.

In these drawings, 10 denotes a casing having bearings 11 and 12 in its side walls near the top thereof, and a trunnion of shaft 13 is journaled in the bearings and extends transversely of the interior of the casing. A leakproof joint is provided between the bearing and the shaft through the employment of a stuffing box 14, or the like, and a lever arm 15 is secured to a projecting end of the shaft. A rock arm 16 is secured on the shaft within the casing and is held rigid with the shaft by a set screw 17, as fully shown in Fig. 4. A suitable cap or cover 18 is applied to the top of the casing and a gasket 19 is employed to provide a leakproof joint between the cap and the wall of the casing, the said cap being held in place by screws, such as 20.

The rock arm has depending ends and each end is provided with a wrist pin 21 on which an apertured lug 22 of a hollow piston 23 is mounted. As the pistons are of identical construction and mounting, the aforesaid description relating to one of them will likewise apply to the other piston. One of the pistons reciprocates in a cylinder 24 and the other operates in conjunction with a cylinder 25. The cylinder 24 has an aperture 26 at its lower end to receive a pivot 27 on which the cylinder oscillates and there is an opening in the lower end of the cylinder, through which fluid may flow to and from the valve 28, which valve has a nipple 29 threaded in an enlarged part of the opening at the bottom of the cylinder.

The valve, which has been generally identified by the numeral 28, has an outer shell with an aperture 30 in its top, whereas its bottom is supplied with a plug 31 engaging internal threads at the lower end of the said shell. The plug has an upwardly extending hollow boss 32 on its upper surface and the said boss is provided with ports 33 extending laterally and communicating with the interior of the valve shell. The plug has vertically disposed ports or apertures 34 through which fluid may flow, as the device is being operated, as will presently appear.

A cup-like valve seat 35 is supported in the shell by a spring 36 which bears against the plug 31 and the said valve seat. The valve seat has a central aperture 37, through which the stem 38 of a valve 39 may reciprocate, it being shown that the valve and stem are provided with a duct 40, through which fluid may flow from the top to the bottom of the valve and stem. The stem is shown as having its lower end extending into the boss 32 so that fluid passing through the duct may escape through the ports 33 and from thence to the ports 34 in the plug. Movement of the valve upwardly is limited by the presence of the lugs 41 which are located on its upper face. There is a slight clearance between the lugs and the upper end wall of the valve shell and to this degree the valve may be displaced with relation to the valve seat to permit fluid to pass between the valve and valve seat and flow outwardly through the upper end of the shell.

In action, therefore, when the piston of the cylinder 24 descends, the valve 39 will be forced to its seat and the fluid passes through the duct 40, the ports 33 and the ports 34, and outwardly through the end of the cylinder, whereas on the rebound or return movement of the piston suction will be created which will unseat the valve 39 and permit the fluid to flow freely around the valve and upwardly through the end of the valve shell, during which time a certain percentage of the fluid may also pass through the ports 33 and the duct 40, but the opening around the valve being less restricted will result in a greater quantity of fluid flowing in that channel.

The valve in the cylinder 25 is of the same construction as the valve 28 and operates in the same manner, but there is a difference in the construction of the cylinder 24 in which it is located. The cylinder 24 has a by-pass 42 in its wall which opens into the cylinder at a location slightly below the upper end of the valve of said cylinder. The piston 23 in the cylinder 25 is in the same relation to the cylinder and valve therein as that of the cylinder 24, the only difference being that so long as the piston 23 is vibrating or reciprocating above the port of the by-pass 42, the fluid will circulate freely in alternate directions through the by-pass and, unless the piston 23 is moved what might be termed abnormally, the action of the piston 23 will serve to absorb vibrations, such, for instance, as are encountered on so-called corduroy roads, but if unusual roughness of the road is encountered or undue movement of the piston 23 results, the piston will seal the port of the by-pass and prevent the fluid from escaping therethrough, in which event, of course, all of the fluid will have to pass through the ports of the valve and such condition will result in retarding the movement of the piston 23.

The assembly and relation of parts are such that the tension of the springs holding the valve seats is originally set to hold the valve seats against movement during the normal operation of the parts, but in order to prevent breakage or damage to any of the working parts, the spring will yield when an abnormal shock pressure overcomes the spring tension. When such abnormal shock pressure is encountered, the valve seat will be forced from its normal position and relieve the pressure by permitting the fluid to flow over the top of the valve seat and down its sides between the valve seat and the inner wall of the shell. This action may be likened to a "pop action", in that the abnormal pressure causes the fluid to escape momentarily to relieve the strain on the working parts, and the valve seat is then immediately replaced in its normal position by the action of the spring, and a continuance of the operation in the normal way ensues.

It is shown in the drawings that the pivots 27 are applied to apertures in the casing and that each pin has a threaded portion 43 which engages in the wall of the aperture near the head of the pin and, by this means, each pin is retained in place so that a piston may oscillate on it. The inner end of each pin is seated in a recess 44 in the opposite wall of the casing.

I claim:

1. In a shock absorber, a casing adapted to hold fluid, oscillatively mounted cylinders therein, a valve in one end of each cylinder, a piston in each cylinder operative to exert pressure when moving toward its respective valve, a rock arm having ends, each of which is pivotally connected to one of said pistons, a trunnion on which the rock arm is secured, a lever arm secured to the trunnion externally of the casing and operative to move the trunnion, means in said valve for retarding the flow of fluid under pressure of the pistons and having means permitting free circulation of the fluid as the pistons move away from the said valves, one of said cylinders having a by-pass communicating with the cylinder approximately on the line of the upper end of the valve, said by-pass being sealed by the piston as it moves toward the valve.

2. In a shock absorber, the combination of two oscillatively mounted cylinders, a casing in which the cylinders are mounted, a valve in one end of each cylinder, each of said valves comprising a shell having a valve seat near its upper end, a valve coacting with the valve seat having a hollow stem, a plug in the lower end of the shell having ports therethrough, a hollow boss extending from the upper surfaces of the plug having laterally disposed ports communicating with the interior of the shell, the valve stem extending into the hollow boss and having its channel communicating with the hollow boss for the passage of fluid, means for limiting the upward movement of the valve, a piston in each cylinder operative to exert pressure when moved toward its respective valve, a lever externally of the casing, members to which the pistons are connected, and means for communicating the motion of the lever to said members.

3. In a shock absorber, a casing adapted to contain fluid, cylinders mounted therein, a valve in each cylinder, each valve comprising a shell, a valve seat near the top of the shell, an apertured plug in the bottom of the shell, a spring interposed between the plug and the valve seat for holding the valve seat in place, a hollow boss extending upwardly from the upper side of the plug, a valve adapted to coact with the valve seat and having a hollow stem projecting into the hollow boss, means on the upper surface of the valve adapted to engage the head of the shell for limiting the motion of the valve, a piston in each cylinder coacting with the valves, and means for communicating motion of parts of an automobile to the said pistons.

4. A valve for a shock absorber comprising a shell having an open upper end, a valve seat therein, an apertured plug in the lower end of the shell having an apertured boss extending upwardly therefrom and provided with lateral ports, a spring interposed between the plug and the valve seat for holding the valve seat in place, a valve coacting with the valve seat having a hollow stem extending into the hollow boss, and means on the upper surface of the valve for limiting the movement of the said valve.

5. In a shock absorber, a valve comprising a shell having an open upper end, a valve seat therein having an opening for a valve stem and normally operative to prevent the escape of fluid over its top, means for yieldingly holding the valve seat in said position, the said means being yieldable upon abnormal pressure above the valve seat to permit the dislodgment of the valve seat and the escape of fluid over its top, a valve in said seat having an opening through which fluid may flow, the said shell being open at it bottom to permit the circulation of fluid therethrough.

FREMONT H. McLAIN.